(12) United States Patent
Kondo (10) Patent No.: US 8,289,896 B2
(45) Date of Patent: Oct. 16, 2012

(54) PACKET TRANSFERRING METHOD, MOBILE COMMUNICATION SYSTEM AND MOBILE STATION

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 2273 days.

(21) Appl. No.: 11/176,205

(22) Filed: Jul. 8, 2005

(65) Prior Publication Data

US 2006/0007881 A1 Jan. 12, 2006

(30) Foreign Application Priority Data

Jul. 9, 2004 (JP) ................................ 2004-203162

(51) Int. Cl.
*H04L 1/02* (2006.01)
*H04L 1/08* (2006.01)
*H04L 12/56* (2006.01)
*H04W 8/00* (2009.01)

(52) U.S. Cl. ..................... 370/328; 370/389; 455/422.1; 714/748

(58) Field of Classification Search .................. None
See application file for complete search history.

(56) References Cited

U.S. PATENT DOCUMENTS

| | | | |
|---|---|---|---|
| 6,367,045 B1 * | 4/2002 | Khan et al. .................... | 714/748 |
| 7,072,655 B2 * | 7/2006 | Ikeda et al. .................... | 455/436 |
| 7,103,019 B1 * | 9/2006 | Moon ........................... | 370/328 |
| 2005/0091431 A1 * | 4/2005 | Olodort et al. ................. | 710/72 |

FOREIGN PATENT DOCUMENTS

| | | |
|---|---|---|
| CN | 1166739 A | 12/1997 |
| JP | 11-341541 A | 12/1999 |
| JP | 2003-324761 A | 11/2003 |

* cited by examiner

*Primary Examiner* — John Pezzlo
*Assistant Examiner* — Matthew Campbell
(74) *Attorney, Agent, or Firm* — Sughrue Mion, PLLC (57) ABSTRACT

In a mobile communication system which includes a base station controller (20), a plurality of radio base stations (30-1, 30-2) connected to the base station controller, and a mobile station (40) simultaneously communicable with the plurality of radio base stations, the base station controller transfers a packet through the plurality of radio base stations to the mobile station. The mobile station receives the packet as a plurality of reception packets as a plurality of reception packets through the plurality of radio base stations. The mobile station includes a processor (46) and a controller (45). The controller selects, among the plurality of reception packets supplied from the plurality of radio base stations, a best-quality packet as a selected packet. The controller sends, if the selected packet includes an error portion, a retransmission request to one of the plurality of base stations in order to request retransmission of a correct portion corresponding to the error portion. The above-mentioned one of the plurality of base stations is a sender of the selected packet. Subsequently, the controller makes the processor execute a data processing operation for the selected packet if the selected packet includes no error portion.

12 Claims, 8 Drawing Sheets

PACKET TRANSFERRING METHOD, MOBILE COMMUNICATION SYSTEM AND MOBILE STATION

This application claims priority to prior Japanese patent application JP 2004-203162, the disclosure of which is incorporated herein by reference.

BACKGROUND OF THE INVENTION

This invention relates to a mobile communication system including a base station controller, a plurality of radio base stations connected to the base station controller, and a mobile station simultaneously communicable with the radio base stations and, in particular, to packet retransmission control from the mobile station to the radio base stations when a packet is transferred from the base station controller through the radio base stations to the mobile station.

Figure 1:
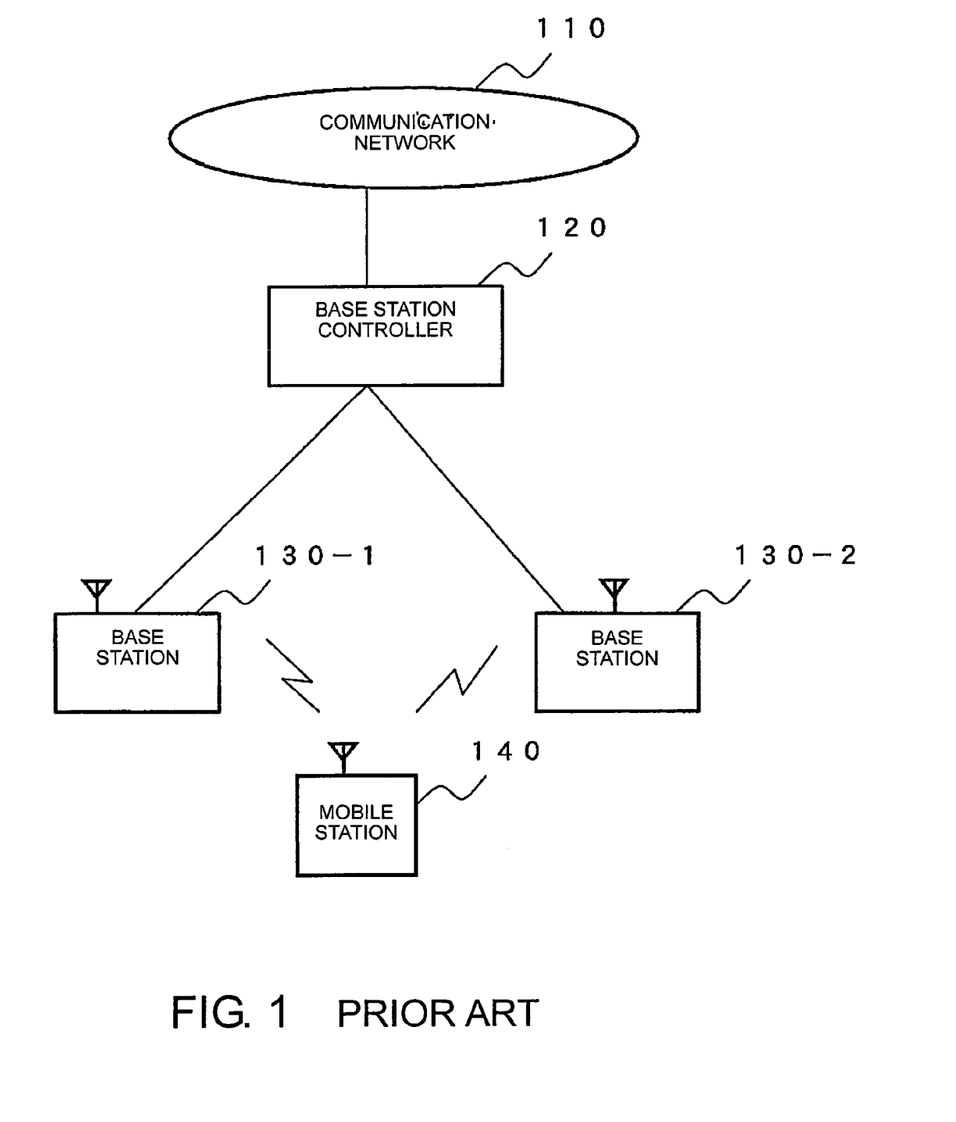
FIG. 1 is a schematic block diagram of a conventional mobile communication system.

For example, a conventional mobile communication system is disclosed in Japanese Unexamined Patent Publication (JP-A) No. H 11-341541. As illustrated in FIG. 1, the mobile communication system disclosed in the publication comprises a base station controller 120 connected to a communication network 110, a plurality of base stations 130-1 and 130-2 connected to the base station controller 120, and a mobile station 140. The mobile station 140 transmits and receives packetized data through radio channels to and from the base stations 130-1 and 130-2 each of which is communicable with the mobile station 140.

In the above-mentioned mobile communication system, a packet transferring method disclosed in the above-mentioned publication is used in case where the mobile station 140 transmits a transmission packet to the base station controller 120 through each of the two base stations 130-1 and 130-2. In this case, the base station controller 120 receives two transmission packets transferred through the two base stations 130-1 and 130-2, respectively, and selects, as a selected packet, one of the two transmission packets which has a smaller number of transmission errors. The base station controller 120 transfers the selected packet to the communication network 110.

However, the above-mentioned publication does not disclose packet retransmission for the purpose of reducing the transmission errors.

In particular, the above-mentioned publication does not disclose packet retransmission control from the mobile station to the radio base stations when a packet is transferred from the base station controller through the radio base stations to the mobile station.

SUMMARY OF THE INVENTION

It is therefore an object of this invention to provide packet retransmission control which is for use in a mobile communication system including a base station controller, a plurality of radio base stations, and a mobile station simultaneously communicable with the radio base stations, and which is carried out from the mobile station to the radio base stations when a packet is transferred from the base station controller through the radio base stations to the mobile station, thereby achieving packet transfer with high reliability.

A packet transferring method according to this invention, a mobile communication system according to this invention, and a mobile station according to this invention are as follows:

(1) A packet transferring method for use in a mobile communication system including a base station controller, a plurality of radio base stations connected to the base station controller, and a mobile station simultaneously communicable with the plurality of radio base stations, the base station controller transferring a packet through the plurality of radio base stations to the mobile station, the mobile station receiving the packet as a plurality of reception packets through the plurality of radio base stations, the mobile station carrying out the steps of:

selecting, among the plurality of reception packets supplied from the plurality of radio base stations, a best-quality packet as a selected packet;

sending, if the selected packet includes an error portion, a retransmission request to one of the plurality of base stations in order to request retransmission of a correct portion corresponding to the error portion, the above-mentioned one of the plurality of base stations being a sender of the selected packet; and executing a data processing operation for the selected packet if the selected packet includes no error portion.

(2) The packet transferring method as described in the section (1), wherein the mobile station selects as the best-quality packet, if each of the plurality of reception packets supplied from the plurality of radio base stations includes the error portion, one of the plurality of reception packets which requires retransmission of a smallest amount of the correct portion corresponding to the error portion.

(3) The packet transferring method as described in the section (1), wherein the mobile station selects as the best-quality packet, if each of the plurality of reception packets supplied from the plurality of radio base stations includes no error portion, one of the plurality of reception packets which has been assembled from fragmented packets of each of the plurality of reception packets at an earliest time instant within a predetermined time period, the mobile station executes the data processing operation for the selected packet selected as the best-quality packet.

(4) The packet transferring method as described in the section (1), wherein the mobile station selects, as the best-quality packet, one of the plurality of reception packets from the radio base stations which has been received at an earliest time instant.

(5) A mobile communication system comprising a base station controller, a plurality of radio base stations connected to the base station controller, and a mobile station simultaneously communicable with the plurality of radio base stations, the base station controller transferring a packet through the plurality of radio base stations to the mobile station, the mobile station receiving the packet as a plurality of reception packets through the plurality of radio base stations, wherein:

the mobile station comprises:

a processor; and a controller for selecting, among the plurality of reception packets supplied from the plurality of radio base stations, a best-quality packet as a selected packet, for sending, if the selected packet includes an error portion, a retransmission request to one of the plurality of base stations in order to request retransmission of a correct portion corresponding to the error portion, the above-mentioned one of the plurality of base stations being a sender of the selected packet, and for making the processor execute a data processing operation for the selected packet if the selected packet includes no error portion.

(6) The mobile communication system as described in the section (5), wherein the controller in the mobile station selects as the best-quality packet, if each of the plurality of reception packets supplied from the plurality of radio base stations includes the error portion, one of the plurality of reception packets which requires retransmission of a smallest amount of the correct portion corresponding to the error portion.

(7) The mobile communication system as described in the section (5), wherein the controller in the mobile station selects as the best-quality packet, if each of the plurality of reception packets supplied from the plurality of radio base stations includes no error portion, one of the plurality of reception packets which has been assembled from fragmented packets of each of the plurality of reception packets at an earliest time instant within a predetermined time period, the mobile station executes the data processing operation for the selected packet selected as the best-quality packet.

(8) The mobile communication system as described in the section (5), wherein the controller in the mobile station selects, as the best-quality packet, one of the plurality of reception packets from the radio base stations which has been received at an earliest time instant.

(9) A mobile station for use in a mobile communication system which comprises a base station controller, a plurality of radio base stations connected to the base station controller, and the mobile station simultaneously communicable with the plurality of radio base stations, the base station controller transferring a packet through the plurality of radio base stations to the mobile station, the mobile station receiving the packet as a plurality of reception packets through the plurality of radio base stations, wherein:

the mobile station comprises:

a processor; and a controller for selecting, among the plurality of reception packets supplied from the plurality of radio base stations, a best-quality packet as a selected packet, for sending, if the selected packet includes an error portion, a retransmission request to one of the plurality of base stations in order to request retransmission of a correct portion corresponding to the error portion, the above-mentioned one of the plurality of base stations being a sender of the selected packet, and for making the processor execute a data processing operation for the selected packet if the selected packet includes no error portion.

(10) The mobile station as described in the section (9), wherein the controller selects as the best-quality packet, if each of the plurality of reception packets supplied from the plurality of radio base stations includes the error portion, one of the plurality of reception packets which requires retransmission of a smallest amount of the correct portion corresponding to the error portion.

(11) The mobile station as described in the section (9), wherein the controller selects as the best-quality packet, if each of the plurality of reception packets supplied from the plurality of radio base stations includes no error portion, one of the plurality of reception packets which has been assembled from fragmented packets of each of the plurality of reception packets at an earliest time instant within a predetermined time period, the mobile station executes the data processing operation for the selected packet selected as the best-quality packet.

(12) The mobile station as described in the section (9), wherein the controller selects, as the best-quality packet, one of the plurality of reception packets from the radio base stations which has been received at an earliest time instant.

In this invention, when a packet is transferred from the base station controller via the radio base stations to the mobile station, the mobile station receives a plurality of packets respectively from the radio base stations and selects, as a selected packet, one of the packets which has a best quality. If the selected packet contains an error portion, the mobile station requests retransmission of a correct portion corresponding to the error portion to one of the radio base stations which is a sender of the selected packet. In this manner, it is possible to achieve packet transfer with high reliability.

DESCRIPTION OF THE PREFERRED EMBODIMENT

Now, this invention will be described in detail with reference to the drawing. Various operations for communication except those related to this invention, including transmission and reception of a control signal, fragmenting and assembling of a packet, transmission and reception of the packet, are carried out by the use of known techniques and detailed description thereof will be omitted.

At first referring to FIG. 2, a mobile communication system according to an embodiment of this invention will be described.

Figure 2:
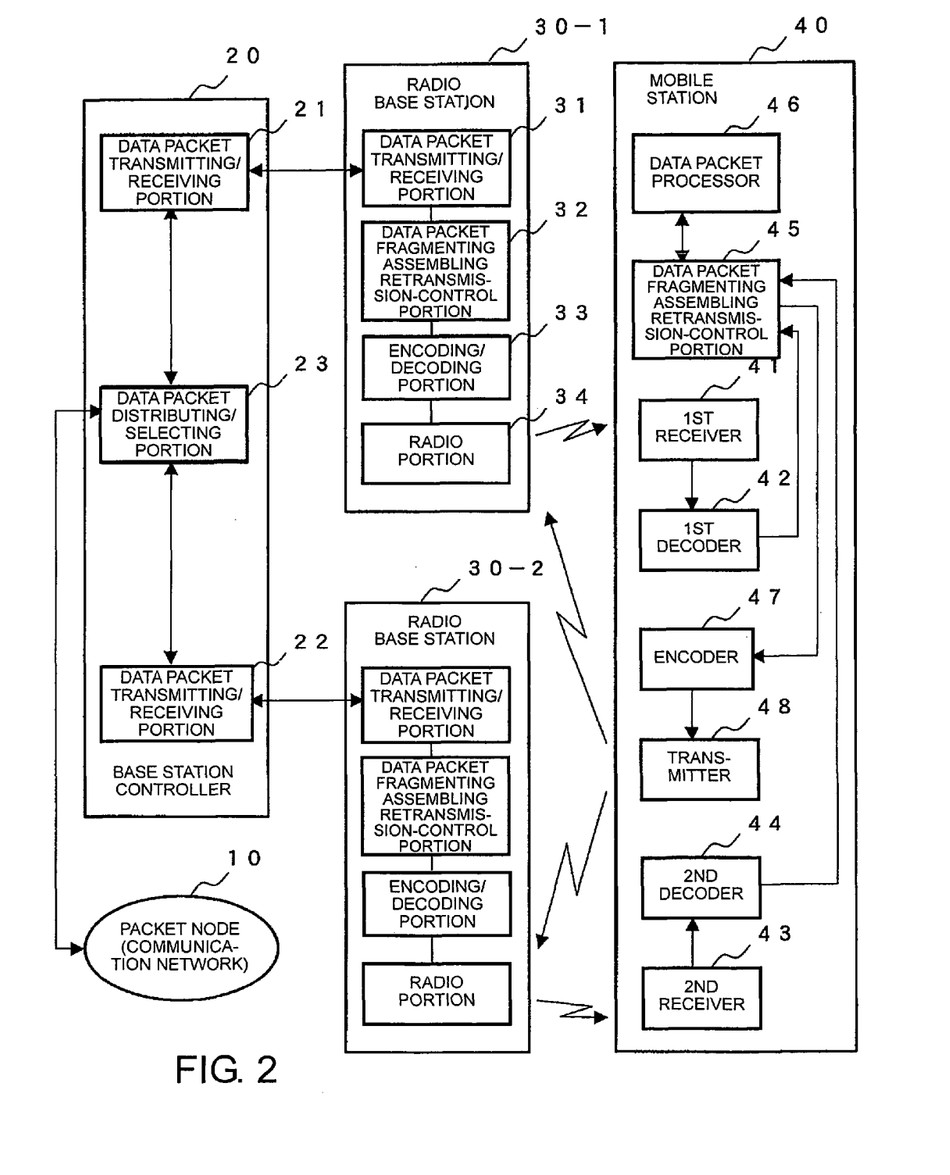
FIG. 2 is a block diagram of a mobile communication system according to an embodiment of this invention.

As illustrated in FIG. 2, the mobile communication system comprises a base station controller 20 connected to a packet node 10, two radio base stations 30-1 and 30-2, and a mobile station 40. The mobile communication system is substantially similar in structure to the conventional system described above but is different therefrom in characteristic function. Although not shown in the figure, a greater number of radio base stations and a plurality of mobile stations are included in the mobile communication system.

The packet node 10 is a node in an upper communication network and serves to perform packet exchange or transfer. The packet node 10 is connected to the base station controller 20 in the mobile communication system. The packet node 10 transmits and receives packetized data (hereinafter will simply be referred to as a packet) to and from the base station controller 20. Further, the packet node 10 transfers a packet to be transmitted to the base station controller 20 and a packet received from the base station controller 20 between the packet node 10 and another packet node via the upper communication network. The base station controller 20 is connected to the packet node 10 on one hand and to the radio base stations 30-1 and 30-2 on the other hand to transmit and receive a packet. The base station controller 20 communicates with the mobile station 40 through the radio base stations 30-1 and 30-2 and radio channels and controls the radio base stations 30-1 and 30-2 connected to the mobile station 40. For example, the mobile station 40 is a mobile communication terminal including a mobile telephone and transmits and receives a packet to and from the radio base stations 30-1 and 30-2 using radio channels in a communicable region.

The base station controller 20 comprises data packet transmitting/receiving portions 21 and 22 and a data packet distributing/selecting portion 23. Each of the data packet transmitting/receiving portions 21 and 22 is connected to the data packet distributing/selecting portion 23.

The data packet transmitting/receiving portions 21 and 22 of the base station controller 20 correspond to the radio base stations 30-1 and 30-2 communicable with the mobile station 40, respectively, and are supplied through the data packet distributing/selecting portion 23 with a downlink packet received from the packet node 10. The downlink packet thus supplied is sent from the data packet transmitting/receiving portion 21 to the radio base station 30-1 and from the data packet transmitting/receiving portion 22 to the radio base station 30-2.

Further, the data packet transmitting/receiving portion 21 receives an uplink packet from the radio base station 30-1. The data packet transmitting/receiving portion 22 receives an uplink packet from the radio base station 30-2. The data packet distributing/selecting portion 23 has also a data packet combining function which receives and compares the uplink packets assembled in correspondence to the radio base stations 30-1 and 30-2, respectively. As a result of comparison, one of the uplink packets assembled and transferred first is selected and transmitted to the packet node 10.

The radio base stations 30-1 and 30-2 have a same structure. Each of the radio base stations 30-1 and 30-2 comprises a data packet transmitting/receiving portion 31, a data packet fragmenting assembling retransmission-control portion 32, an encoding/decoding portion 33, and a radio portion 34 which are connected in series in this order.

In the radio base station 30-1, the data packet transmitting/receiving portion 31 receives the downlink packet from the base station controller 20 and sends the downlink packet to the data packet fragmenting assembling retransmission-control portion 32. Further, the data packet transmitting/receiving portion 31 transmits the uplink packet to the base station controller 20. Depending upon a traffic condition at the radio base station 30-1 at that time instant, the data packet fragmenting assembling retransmission-control portion 32 has functions of fragmenting the downlink packet into a plurality of blocks and carrying out retransmission control with the mobile station 40. On the other hand, the data packet fragmenting assembling retransmission-control portion 32 assembles fragmented packets from the mobile station 40 into the uplink packet. The encoding/decoding portion 33 encodes transmission data into encoded transmission data and decodes reception data. The radio portion 34 transmits the encoded transmission data as downlink fragmented packets to the mobile station 40 and receives the transmission data from the mobile station 40 as uplink fragmented packets. The radio base station 30-2 is operable in the same manner and description thereof will be omitted.

The mobile station comprises a first receiver 41 corresponding to the radio base station 30-1, a first decoder 42 connected to the first receiver 41, a second receiver 43 corresponding to the radio base station 30-2, a second decoder 44 connected to the second receiver 43, a data packet fragmenting assembling retransmission-control portion 45 corresponding to both of the radio base stations 30-1 and 30-2, a data packet processor 46 connected to the data packet fragmenting assembling retransmission-control portion 45, an encoder 47, and a transmitter 48 connected to the encoder 47. Each of the first and the second decoders 42 and 44 and the encoder 47 is connected to the data packet fragmenting assembling retransmission-control portion 45.

The first and the second receivers 41 and 43 receive the downlink fragmented packets from the radio base stations 30-1 and 30-2, respectively. The first and the second decoders 42 and 44 decode the downlink fragmented packets. The data packet fragmenting assembling retransmission-control portion 45 selects one of the radio base stations 30-1 and 30-2 which is a sender of the downlink fragmented packets having a smaller number of errors or the downlink fragmented packets received earlier by a predetermined time. The data packet fragmenting assembling retransmission-control portion 45 has a retransmission control function and assembles a plurality of downlink fragmented packets into a single downlink packet. The data packet fragmenting assembling retransmission-control portion 45 fragments the uplink packet into a plurality of uplink fragmented packets and sends the uplink fragmented packets to the encoder 47. In case where retransmission control is carried out, a retransmission request including radio base station information and retransmission control information is sent to the encoder 47. The data packet processor 46 carries out data processing for the packets and produces the uplink packet from the transmission data. The encoder 47 encodes the transmission data into the encoded transmission data. The transmitter 48 transmits the encoded transmission data as the uplink fragmented packets to the radio base stations 30-1 and 30-2.

Figure 3:
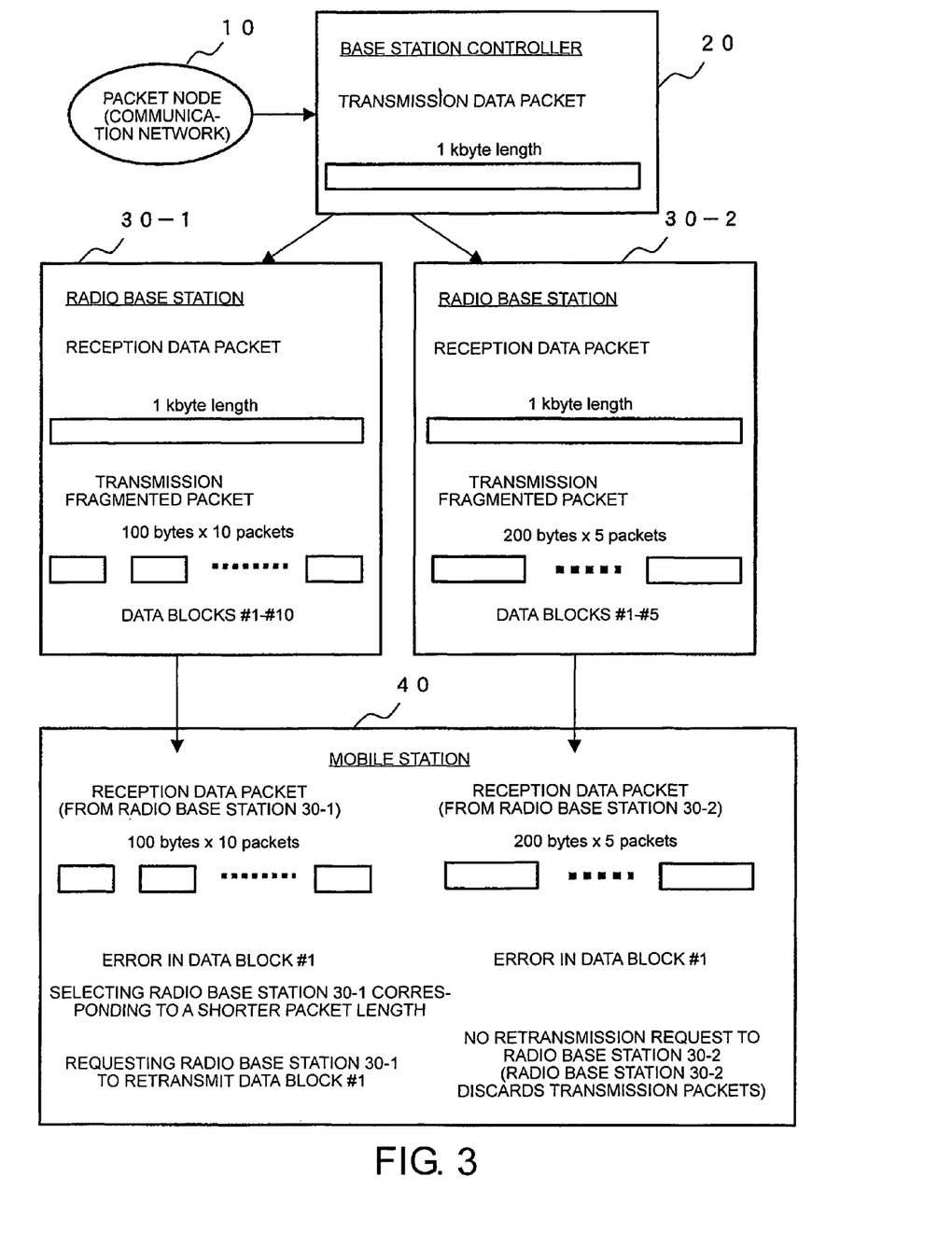
FIG. 3 is a view for describing packet fragmentation in the mobile communication system illustrated in FIG. 2.

Referring to FIG. 3 in addition to FIG. 2, a data processing operation related to fragmenting of a downlink data packet will be described as a characteristic of this invention. The data packet is fragmented depending upon the traffic condition of each of the radio base stations 30-1 and 30-2.

In the illustrated example, the base station controller 20 sends a downlink data packet having a length of 1 kbyte to each of the radio base stations 30-1 and 30-2.

Depending upon the traffic condition of each of the radio base stations 30-1 and 30-2, the data packet fragmenting assembling retransmission-control portion 32 fragments the data packet into a plurality of data blocks. Specifically, in the radio base station 30-1, the data packet fragmenting assembling retransmission-control portion 32 fragments the data packet having a length of 1 kbyte into 10 packets each having a length of 100 bytes. In the radio base station 30-2, the data packet fragmenting assembling retransmission-control portion 32 fragments the data packet having a length of 1 kbyte into 5 packets each having a length of 200 bytes. The radio base stations 30-1 and 30-2 independently send the data blocks to the mobile station 40 connected thereto. The mobile station 40 is connected to both of the radio base stations 30-1 and 30-2 and receives, as reception data packets, the data blocks from the radio base stations 30-1 and 30-2 by the data packet fragmenting assembling retransmission-control portion 45.

Consideration will be made about the case where the data packet fragmenting assembling retransmission-control portion 45 detects a transmission error in a data block #1 in each of the two reception data packets. The number of bytes of the data block #1 supplied from the radio base station 30-1 is equal to a half of the number of bytes of the data block #1 supplied from the radio base station 30-2. Therefore, the data packet fragmenting assembling retransmission-control portion 45 selects the radio base station 30-1 which is a sender of the data block #1 having a smaller packet length. In case where a plurality of data blocks contain errors (those data blocks containing errors may also be called error data blocks or error portions), the data packet fragmenting assembling retransmission-control portion 45 selects, for example, the radio base station 30-1 which is a sender of the error data blocks with a smaller total number of errors. The data packet fragmenting assembling retransmission-control portion 32 of the radio base station 30-1 is supplied with a retransmission request for the error data block or blocks (error portion or portions). The data packet fragmenting assembling retransmission-control portion 32 of the radio base station 30-2 which is not supplied with a retransmission request discards a transmission data packet which has been retained for retransmission.

In other words, when the base station controller 20 transfers a packet to the mobile station 40 via the radio base stations 30-1 and 30-2, the data packet fragmenting assembling retransmission-control portion 45 of the mobile station 40 selects, as a selected packet, one of reception packets from the radio base stations 30-1 and 30-2 which has a best quality (best-quality packet). If the selected packet contains an error portion, the data packet fragmenting assembling retransmission-control portion 45 sends a retransmission request for the error portion to one of the radio base stations 30-1 and 30-2 which is a sender of the selected packet. If the selected packet contains no error portion, the selected packet is subjected to data processing at the data packet processor 46.

Preferably, in case where both of the reception packets from the radio base stations 30-1 and 30-2 contain error portions, the data packet fragmenting assembling retransmission-control portion 45 of the mobile station 40 selects, as the best-quality packet, one of the reception packets which requires a smaller amount of retransmission of the error portion.

In case where both of the reception packets from the radio base stations 30-1 and 30-2 do not contain error portions, the data packet fragmenting assembling retransmission-control portion 45 of the mobile station 40 selects, as the best-quality packet, one of the reception packets which has been assembled from the fragmented packets first (or, at an earliest time instant) within a predetermined time period. The selected packet is processed by the data packet processor 46.

The data packet fragmenting assembling retransmission-control portion 45 of the mobile station 40 may select, as the best-quality packet, one of the reception packets from the radio base stations 30-1 and 30-2 which has been received first.

Figure 4:
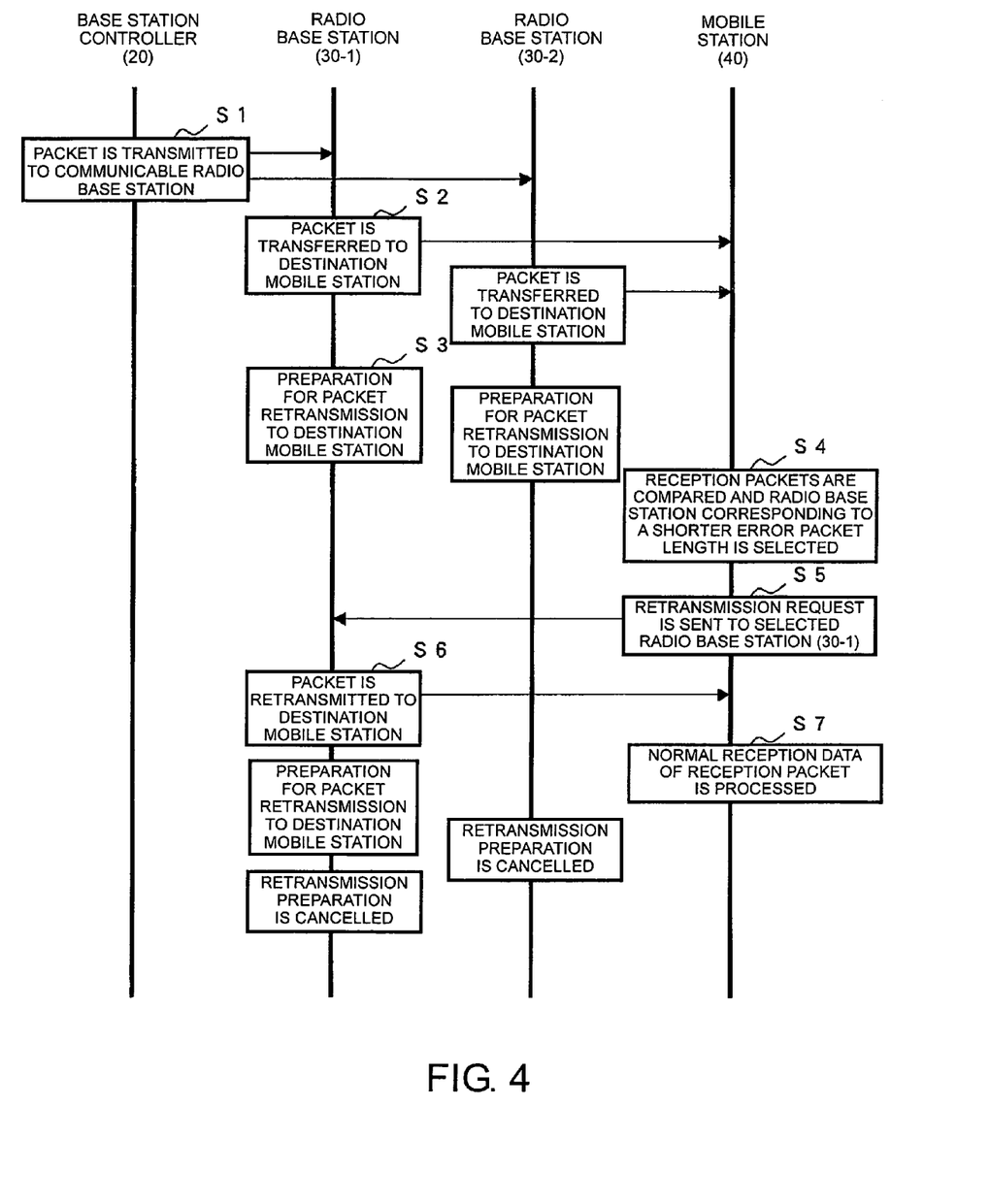
FIG. 4 is a sequence chart for describing a flow of a downlink packet in the mobile communication system illustrated in FIG. 2.

Next referring to FIG. 4 in addition to FIG. 2, description will be made of transfer of the downlink packet in the mobile communication system.

In the base station controller 20, the data packet distributing/selecting portion 23 distributes the downlink packet supplied from the packet node 10 to each of the data packet transmitting/receiving portions 21 and 22 corresponding to the radio base stations 30-1 and 30-2 communicable with the mobile station 40 in accordance with a destination address contained in the packet. The packet thus distributed is transmitted from the data packet transmitting/receiving portion 21 to the radio base station 30-1 on one hand and from the data packet transmitting/receiving portion 22 to the radio base station 30-2 on the other hand (step S1).

The downlink packet supplied from the base station controller 20 to the radio base station 30-1 is sent from the data packet transmitting/receiving portion 31 to the data packet fragmenting assembling retransmission-control portion 32. The data packet fragmenting assembling retransmission-control portion 32 fragments the reception packet into a plurality of blocks as fragmented transmission packets and temporarily retains the fragmented transmission packets for retransmission control between the radio base station 30-1 and the mobile station 40 as a retransmission preparation step (step S3). On the other hand, the transmission data are encoded by the encoding/decoding portion 33 into the encoded transmission data. The encoded transmission data are transmitted from the radio portion 34 to the mobile station 40 as the downlink fragmented packets. The radio base station 30-2 is operable in the similar manner.

In the mobile station 40, the first receiver 41 receives the downlink fragmented packets from the radio base station 30-1 as reception packets. The second receiver 43 receives the downlink fragmented packets from the radio base station 30-2 as reception packets. The reception packets are decoded by the first and the second decoders 42 and 44 into reception data, respectively. The data packet fragmenting assembling retransmission-control portion 45 compares the two reception data and selects, for example, one of the radio base stations 30-1 and 30-2 which is a sender of the reception packets containing an error fragmented packet having a shorter error packet length (step S4). Specifically, if there is a plurality of error fragmented packets, one of the radio base stations 30-1 and 30-2 which is a sender of the reception packets containing the error fragmented packets with a shorter total length is selected. If the transmission error is detected in the reception packets, the selected radio base station, for example, the radio base station 30-1 is supplied with a retransmission request through the encoder 47 and the transmitter 48 (step S5).

In the radio base station 30-1, the data packet fragmenting assembling retransmission-control portion 32 receives the retransmission request via the radio portion 34 and the encoding/decoding portion 33. Among the transmission packets temporarily retained, a designated downlink fragmented packet is retransmitted to the mobile station 40 as a destination (step S6).

If the mobile station 40 receives the downlink fragmented packet normally, i.e., without an error, the downlink fragmented packet is subjected to data processing at the data packet processor 46 (step S7). The radio base station 30-2 which is not supplied with the retransmission request cancels retransmission preparation and discards the transmission packets temporarily retained.

Figure 5:
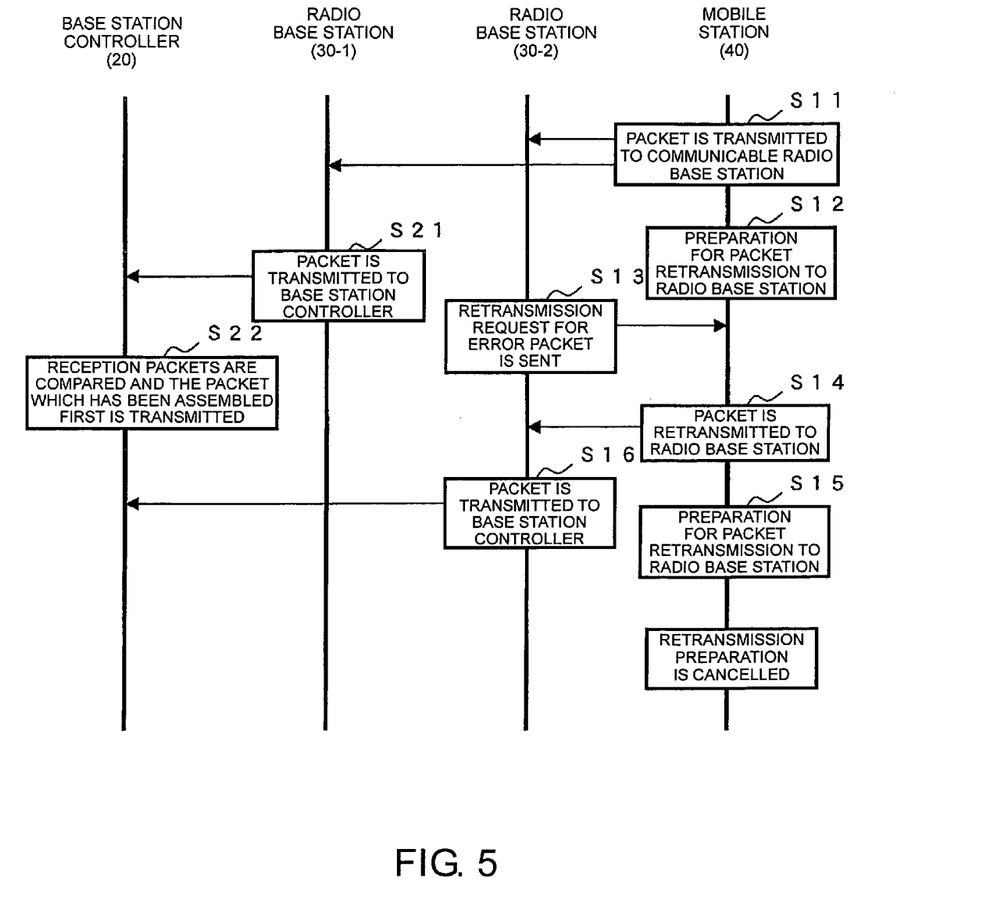
FIG. 5 is a sequence chart for describing a flow of an uplink packet in the mobile communication system illustrated in FIG. 2.

Next referring to FIG. 5 in addition to FIG. 2, description will be made of transfer of the uplink packet in the mobile communication system.

The data packet processor 46 of the mobile station 40 produces the uplink packet from the transmission data. The uplink packet thus produced is sent to the data packet fragmenting assembling retransmission-control portion 45 and fragmented into the uplink fragmented packets. The uplink fragmented packets are sent to the encoder 47 to be encoded into encoded uplink fragmented packets. The transmitter 48 transmits the encoded uplink fragmented packets to the radio base stations 30-1 and 30-2 (step S11).

The data packet fragmenting assembling retransmission-control portion 45 makes retransmission preparation in case of reception of the retransmission request (step S12).

For example, in the radio base station 30-2, the radio portion 34 receives the uplink fragmented packets from the mobile station 40 and sends the uplink fragmented packets to the encoding/decoding portion 33. The encoding/decoding portion 33 decodes the uplink fragmented packets into decoded uplink fragmented packets and transfers the decoded uplink fragmented packets to the data packet fragmenting assembling retransmission-control portion 32. If a transmission error in any fragmented packet or packets is detected, the data packet fragmenting assembling retransmission-control portion 32 sends a retransmission request for an error fragmented packet or packets as the error portion or portions to the mobile station 40 through the encoding/decoding portion 33 and the radio portion 34 (step S13). The retransmission request contains radio base station information and retransmission control information.

When the mobile station 40 is supplied with the retransmission request from the radio base station 30-2, the data packet fragmenting assembling retransmission-control portion 45 receives the retransmission request via the second receiver 43 and the second decoding portion 44. Among the transmission packets temporarily retained, a designated uplink fragmented packet is retransmitted to the radio base station 30-2 as a destination (step S14). The data packet fragmenting assembling retransmission-control portion 45 makes retransmission preparation in case of reception of the retransmission request (step S15).

The fragmented packets retransmitted to the radio base station 30-2 are received by the radio portion 34 and sent to the encoding/decoding portion 33. The retransmitted fragmented packets are decoded by the encoding/decoding portion 33 and transferred to the data packet fragmenting assembling retransmission-control portion 32. The data packet fragmenting assembling retransmission-control portion 32 assembles normal fragmented packets, including the retransmitted fragmented packets, into the uplink packet. The uplink packet thus assembled is transmitted from the data packet transmitting/receiving portion 31 to the base station controller 20 (step S16).

On the other hand, in the radio base station 30-1, the uplink fragmented packets from the mobile station 40 are transferred via the radio portion 34 and the encoding/decoding portion 33 to the data packet fragmenting assembling retransmission-control portion 32. The data packet fragmenting assembling retransmission-control portion 32 assembles normal fragmented packets into the uplink packet. The uplink packet is transmitted from the data packet transmitting/receiving portion 31 to the base station controller 20 (step S21).

In the base station controller 20, the data packet transmitting/receiving portion 21 receives the uplink packet from the radio base station 30-1 and the data packet transmitting/receiving portion 22 receives the uplink packet from the radio base station 30-2. These uplink packets are sent to the data packet distributing/selecting portion 23. The data packet distributing/selecting portion 23 compares the two uplink packets respectively assembled and transmitted in correspondence to the radio base stations 30-1 and 30-2 and selects, as a selected packet, one of the uplink packets which has first been assembled and transmitted. The selected packet is transmitted to the packet node 10 (step S21).

In the illustrated example, the uplink packet from the radio base station 30-1 without the retransmission control is selected while the uplink packet from the radio base station 30-2 is discarded.

Figure 6:
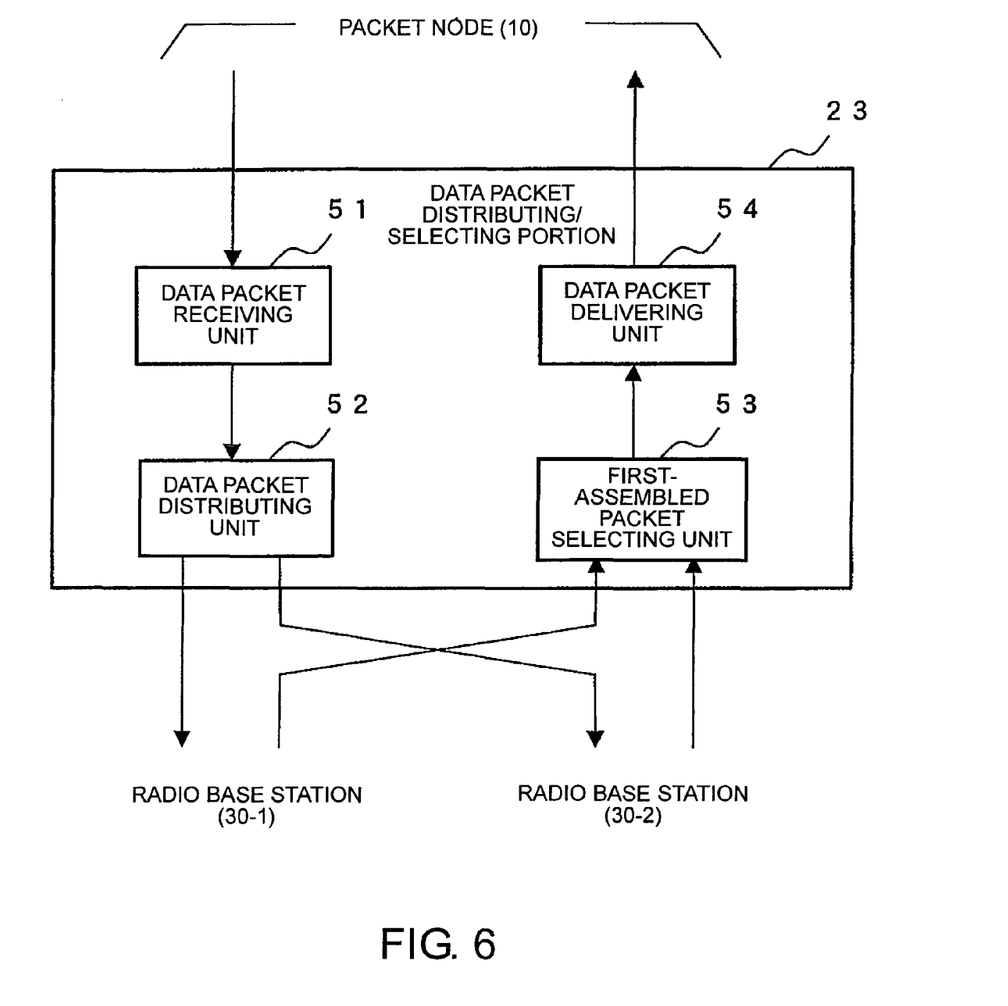
FIG. 6 is a functional block diagram of a data packet distributing/selecting portion illustrated in FIG. 2.

Next referring to FIG. 6, description will be made of the data packet distributing/selecting portion 23 of the base station controller 20.

The data packet distributing/selecting portion 23 comprises a data packet receiving unit 51, a data packet distributing unit 52, a first-assembled packet selecting unit 53, and a data packet delivering unit 54.

The data packet receiving unit 51 sends the downlink packet received from the packet node 10 to the data packet distributing unit 52. The data packet distributing unit 52 distributes the downlink packet supplied thereto to the radio base stations 30-1 and 30-2. When the uplink packets from the same sender are supplied from the radio base stations 30-1 and 30-2, the first-assembled packet selecting unit 53 selects, as a selected uplink packet, one of the uplink packets which has first been assembled, and sends the selected uplink packet to the data packet delivering unit 54. The data packet delivering unit 54 delivers the selected uplink packet supplied thereto to the packet node 10.

In the foregoing description, in retransmission control of the downlink packet, the mobile station 40 selects the radio base station which is a sender of the error packet or packets with a shortest error packet length. Alternatively, the radio base station which is a sender of the packet received earlier by a predetermined time may be selected. In the foregoing description, the packet is distributed to the two radio base stations. However, the packet may be distributed to a greater number of the radio base stations.

As described above, a best-quality channel is selected from a plurality of radio channels so that the reliability of communication is improved. In addition, by the use of the radio channel selecting technique capable of reducing a packet transfer time in retransmission control, it is possible to improve the efficiency of communication.

Figure 7:
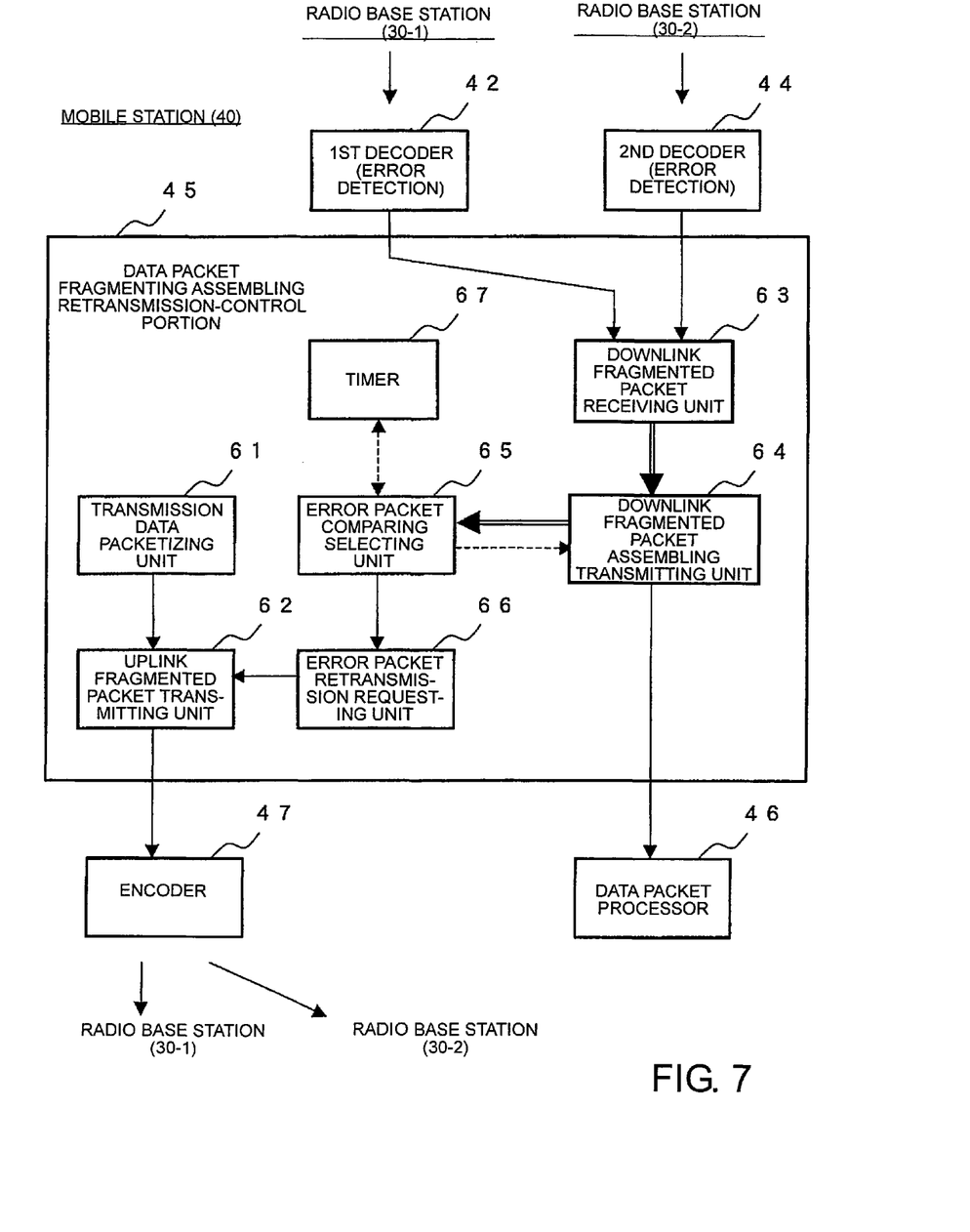
FIG. 7 is a functional block diagram of a data packet fragmenting assembling retransmission-control portion illustrated in FIG. 2.

Referring to FIG. 7, description will be made of the data packet fragmenting assembling retransmission-control portion 45 of the mobile station 40.

The data packet fragmenting assembling retransmission-control portion 45 comprises a transmission data packetizing unit 61, an uplink fragmented packet transmitting unit 62, a downlink fragmented packet receiving unit 63, a downlink fragmented packet assembling transmitting unit 64, an error packet comparing selecting unit 65, an error packet retransmission requesting unit 66, and a single packet detecting timer (hereinafter simply be referred to as a timer) 67.

The transmission data packetizing unit 61 is connected to the uplink fragmented packet transmitting unit 62 and packetizes transmission data into uplink fragmented packets which are sent to the uplink fragmented packet transmitting unit 62. The uplink fragmented packet transmitting unit 62 is connected to the error packet retransmission requesting unit 66 and the encoder 47 and transmits the uplink fragmented packets supplied from the transmission data packetizing unit 61 or the retransmission request supplied from the error packet retransmission requesting unit 66 to the encoder 47.

The downlink fragmented packet receiving unit 63 is connected to the downlink fragmented packet assembling transmitting unit 64. The downlink fragmented packet receiving unit 63 receives the downlink fragmented packets from the radio base stations 30-1 and 30-2 through the first and the second decoders 42 and 44, respectively, and transfers the downlink fragmented packets to the downlink fragmented packet assembling transmitting unit 64. The downlink fragmented packet assembling transmitting unit 64 is connected to the error packet comparing selecting unit 65 and the data packet processor 46. The downlink fragmented packet assembling transmitting unit 64 transfers the error packet to the error packet comparing selecting unit 65 and assembles the downlink fragmented packets supplied thereto into a normal packet to transmit the normal packet to the data packet processor 46. When the normal packet is delivered, other packets from the same sender are discarded.

The error packet comparing selecting unit 65 is connected to the error packet retransmission requesting unit 66 and the timer 67. The error packet comparing selecting unit 65 is supplied with the error packet from the downlink fragmented packet assembling transmitting unit 64 and starts the timer 67. When another packet from the same sender is detected, the timer 67 is initialized and these packets are compared under a predetermined condition to select one of these packets. When a timer period of the timer 67 has lapsed, it is judged that an independent packet from only one radio base station is received. Therefore, upon completion of assembling of the fragmented packets, the error packet comparing selecting unit 65 transmits the retransmission request through the error packet retransmission requesting unit 66 in order to request retransmission of the error packet. As the predetermined condition, the error packet comparing selecting unit 65 supplied with a plurality of packets compares the total numbers of bytes of the error packets and selects the radio base station which is a sender of the error packet requiring retransmission of a shortest total packet length. The error packet comparing selecting unit 65 sends a notice indicating the result of selection to the error packet retransmission requesting unit 66. The notice includes radio base station information and retransmission control information.

In response to the notice from the error packet comparing selecting unit 65, the error packet retransmission requesting unit 66 transmits the retransmission request to the encoder 47 through the uplink fragmented packet transmitting unit 62.

Figure 8:
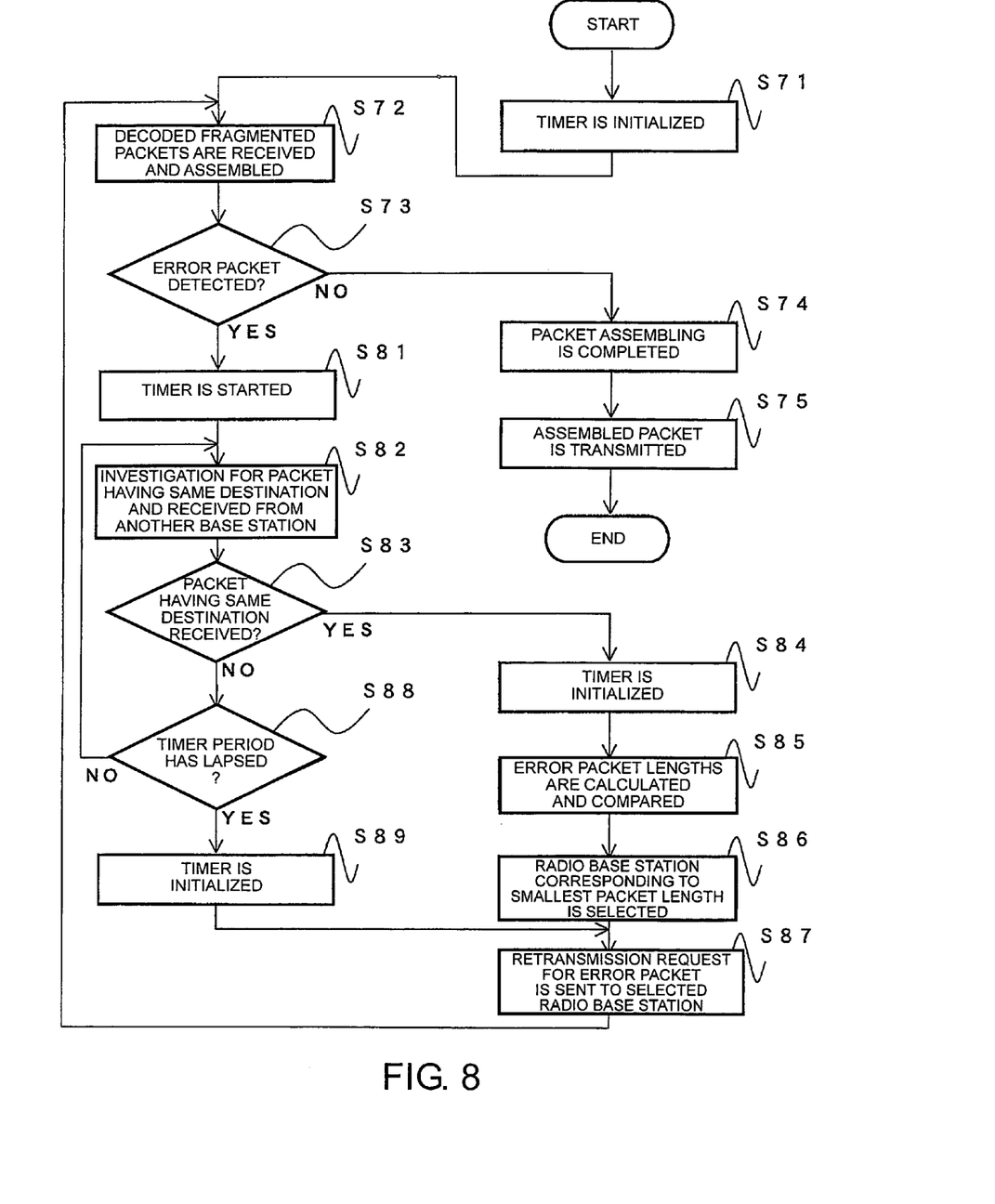
FIG. 8 is a flow chart for describing an operation of the data packet fragmenting assembling retransmission-control portion illustrated in FIG. 7.

Next referring to FIG. 8 in addition to FIG. 7, description will be made of an operation of receiving the downlink fragmented packets.

At first, the timer 67 is initialized when a power supply is turned on (step S71).

Supplied with the fragmented packets decoded by the first or the second decoder 42 or 44 through the downlink fragmented packet receiving unit 63, the downlink fragmented packet assembling transmitting unit 64 assembles the fragmented packets (step S72). At this time, the error packet is transferred to the error packet comparing selecting unit 65.

It is assumed that no error packet is detected (NO in step S73). In this event, upon completion of assembling of the downlink fragmented packets into the downlink packet (step S74), the downlink fragmented packet assembling transmitting unit 64 transmits the downlink packet thus assembled to the data packet processor 46 (step S75). Then, the operation comes to an end.

In presence of the error packet (YES in step S73), the downlink fragmented packet assembling transmitting unit 64 sends the error fragmented packet to the error packet comparing selecting unit 65. The error packet comparing selecting unit 65 starts the timer 67 (step S81) to start time monitoring and checks presence or absence of the error fragmented packet supplied from another radio base station to the mobile station 40 as the same destination (step S82).

If the error fragmented packet addressed to the same destination is received (YES in step S83), the error packet comparing selecting unit 65 initializes the timer 67 (step S84). On the other hand, the error packet comparing selecting unit 65 calculates the error packet length for each of the two reception packets and compares the error packet lengths, i.e., the byte lengths to be retransmitted (step S85). In case of the packets received from a plurality of radio base stations, one of the radio base stations which is a sender of the packet having a shortest packet length is selected as a result of comparison (step S86). The error packet comparing selecting unit 65 transfers the radio base station information indicative of the selected radio base station and the error packet subjected to retransmission to the error packet retransmission requesting unit 66. The error packet retransmission requesting unit 66 processes the retransmitted data into fragmented packets and sends the retransmission request for the error packet to the selected radio base station (step S87). Then, the operation returns to the step S72 to wait reception of a retransmitted packet corresponding to the error packet.

If the same packet is not received (NO in step S83) and the timer period of the timer 67 has lapsed (YES in step S88), the timer 67 is initialized (step S89). Then, the operation proceeds to the step S87. Specifically, the error packet comparing selecting unit 65 transfers the radio base station information indicative of the selected radio base station and the error packet subjected to retransmission to the error packet retransmission requesting unit 66. The error packet retransmission requesting unit 66 processes the retransmitted data into the fragmented packets and sends the retransmission request for the error packet to the selected radio base station.

While the present invention has thus far been described in connection with the preferred embodiment thereof, it will readily be possible for those skilled in the art to put this invention into practice in various other manners.

What is claimed is:

1. A packet transferring method for use in a mobile communication system including a base station controller, a plurality of radio base stations connected to said base station controller, and a mobile station simultaneously communicable with said plurality of radio base stations, said base station controller transferring a packet through said plurality of radio base stations to said mobile station, said mobile station receiving said packet as a plurality of reception packets through said plurality of radio base stations, said mobile station carrying out the steps of:

selecting, among said plurality of reception packets supplied from said plurality of radio base stations, a best-quality packet as a selected packet;

sending, if said selected packet includes an error portion, a retransmission request to one of said plurality of base stations in order to request retransmission of a correct portion corresponding to said error portion, said one of the plurality of base stations being a sender of said selected packet; and executing a data processing operation for said selected packet if said selected packet includes no error portion.

2. The packet transferring method as claimed in claim 1, wherein said mobile station selects as said best-quality packet, if each of said plurality of reception packets supplied from said plurality of radio base stations includes said error portion, one of said plurality of reception packets which requires retransmission of a smallest amount of the correct portion corresponding to said error portion.

3. The packet transferring method as claimed in claim 1, wherein said mobile station selects as said best-quality packet, if each of said plurality of reception packets supplied from said plurality of radio base stations includes no error portion, one of said plurality of reception packets which has been assembled from fragmented packets of each of said plurality of reception packets at an earliest time instant within a predetermined time period, said mobile station executes the data processing operation for the selected packet selected as said best-quality packet.

4. The packet transferring method as claimed in claim 1, wherein said mobile station selects, as said best-quality packet, one of said plurality of reception packets from said radio base stations which has been received at an earliest time instant.

5. A mobile communication system comprising a base station controller, a plurality of radio base stations connected to said base station controller, and a mobile station simultaneously communicable with said plurality of radio base stations, said base station controller transferring a packet through said plurality of radio base stations to said mobile station, said mobile station receiving said packet as a plurality of reception packets through said plurality of radio base stations, wherein:

said mobile station comprises:
a processor; and
a controller for selecting, among said plurality of reception packets supplied from said plurality of radio base stations, a best-quality packet as a selected packet,
for sending, if said selected packet includes an error portion, a retransmission request to one of said plurality of base stations in order to request retransmission of a correct portion corresponding to said error portion, said one of the plurality of base stations being a sender of said selected packet, and
for making said processor execute a data processing operation for said selected packet if said selected packet includes no error portion.

6. The mobile communication system as claimed in claim 5, wherein said controller in said mobile station selects as said best-quality packet, if each of said plurality of reception packets supplied from said plurality of radio base stations includes said error portion, one of said plurality of reception packets which requires retransmission of a smallest amount of the correct portion corresponding to said error portion.

7. The mobile communication system as claimed in claim 5, wherein said controller in said mobile station selects as said best-quality packet, if each of said plurality of reception packets supplied from said plurality of radio base stations includes no error portion, one of said plurality of reception packets which has been assembled from fragmented packets of each of said plurality of reception packets at an earliest time instant within a predetermined time period, said mobile station executes the data processing operation for the selected packet selected as said best-quality packet.

8. The mobile communication system as claimed in claim 5, wherein said controller in said mobile station selects, as said best-quality packet, one of said plurality of reception packets from said radio base stations which has been received at an earliest time instant.

9. A mobile station for use in a mobile communication system which comprises a base station controller, a plurality of radio base stations connected to said base station controller, and said mobile station simultaneously communicable with said plurality of radio base stations, said base station controller transferring a packet through said plurality of radio base stations to said mobile station, said mobile station receiving said packet as a plurality of reception packets through said plurality of radio base stations, wherein:

said mobile station comprises:
a processor; and
a controller for selecting, among said plurality of reception packets supplied from said plurality of radio base stations, a best-quality packet as a selected packet,
for sending, if said selected packet includes an error portion, a retransmission request to one of said plurality of base stations in order to request retransmission of a correct portion corresponding to said error portion, said one of the plurality of base stations being a sender of said selected packet, and
for making said processor execute a data processing operation for said selected packet if said selected packet includes no error portion.

10. The mobile station as claimed in claim 9, wherein said controller selects as said best-quality packet, if each of said plurality of reception packets supplied from said plurality of radio base stations includes said error portion, one of said plurality of reception packets which requires retransmission of a smallest amount of the correct portion corresponding to said error portion.

11. The mobile station as claimed in claim 9, wherein said controller selects as said best-quality packet, if each of said plurality of reception packets supplied from said plurality of radio base stations includes no error portion, one of said plurality of reception packets which has been assembled from fragmented packets of each of said plurality of reception packets at an earliest time instant within a predetermined time period, said mobile station executes the data processing operation for the selected packet selected as said best-quality packet.

12. The mobile station as claimed in claim 9, wherein said controller selects, as said best-quality packet, one of said plurality of reception packets from said radio base stations which has been received at an earliest time instant.

\* \* \* \* \*